(No Model.)
J. WHITE.
PROCESS OF AND APPARATUS FOR POPPING OR BURSTING BARLEY, &c.
No. 508,125. Patented Nov. 7, 1893.
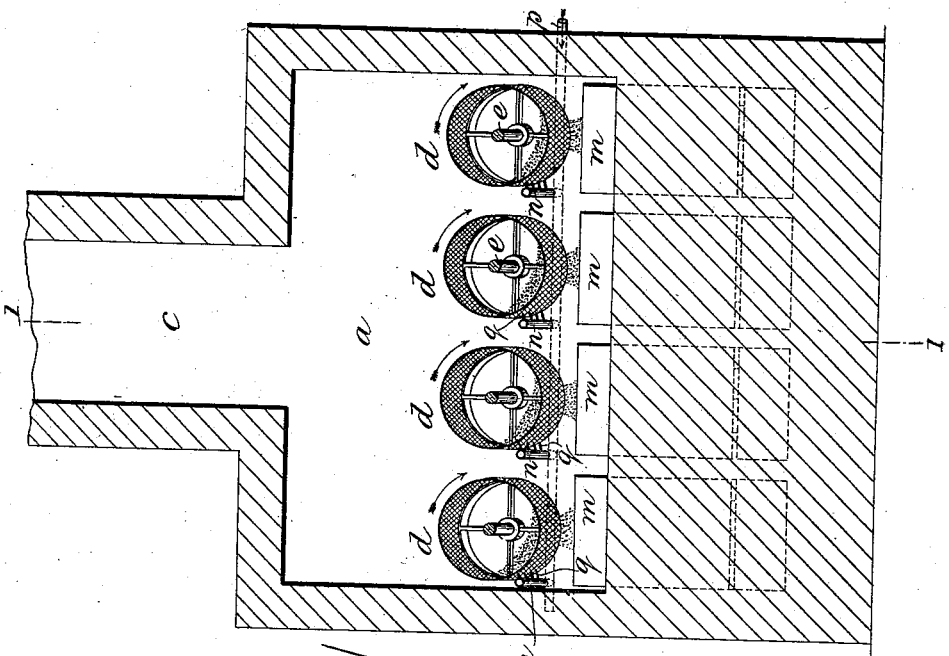
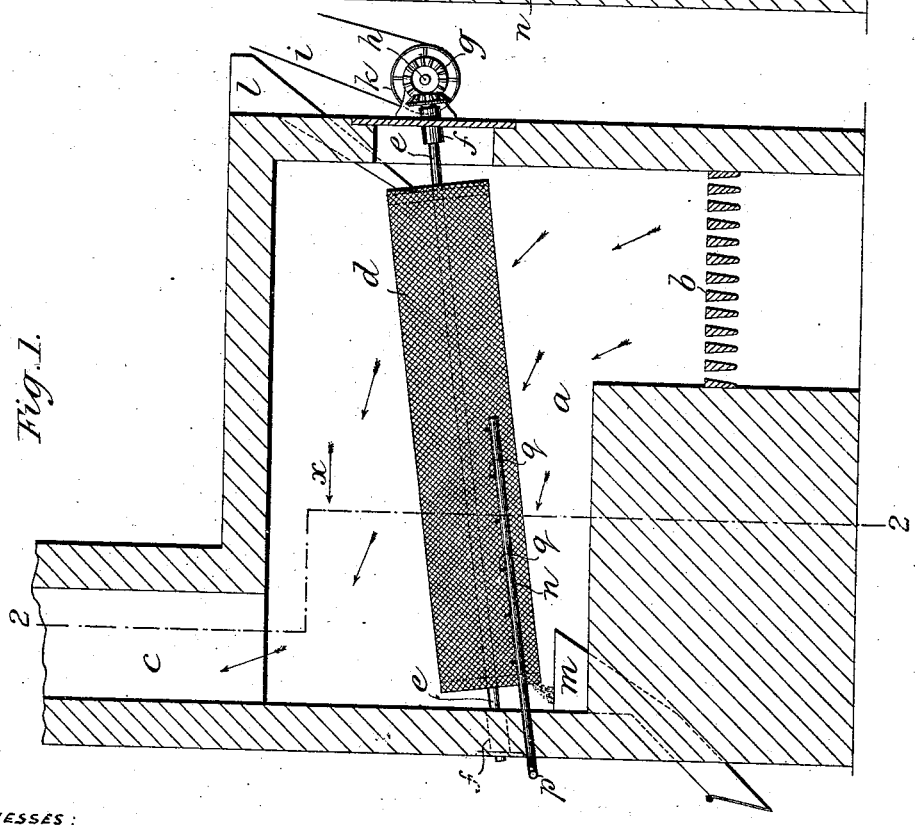
WITNESSES:
Fred White.
C. K. Fraser.
INVENTOR:
James White,
By his Attorneys
Arthur C. Fraser & Co.
THE NATIONAL LITHOGRAPHING COMPANY,
WASHINGTON, D. C.

United States Patent Office.

JAMES WHITE, OF LONDON, ENGLAND.

PROCESS OF AND APPARATUS FOR POPPING OR BURSTING BARLEY, &c.

SPECIFICATION forming part of Letters Patent No. 508,125, dated November 7, 1893.

Application filed October 2, 1893. Serial No. 487,042. (No model.) Patented in England November 26, 1892, No. 21,632.

*To all whom it may concern:*

Be it known that I, JAMES WHITE, of London, England, have invented a certain new and useful Process of and Apparatus for Popping or Bursting Barley, Maize, or other Grain, (for which I have obtained a patent in Great Britain, No. 21,632, bearing date November 26, 1892,) of which the following is a specification.

This invention has reference to the popping or bursting of barley, maize or other grain. In the process or method which has hitherto been generally adopted the popping or bursting of grain is effected by bringing hot air or fumes into direct contact with the grain while this is caused to travel down an inclined rotating wire woven or foraminous cylinder or other carrier or conveyer. In such process the grain is liable to become burned by direct contact with the hot air or products; further the popping or bursting is sometimes imperfect or irregular.

Now my invention relates to an improved process or method and apparatus whereby all liability of the grain to get burned during the popping or bursting process is prevented.

My process or method consists in submitting the grain to be popped or burst to the simultaneous action of hot air or hot fumes brought into direct contact with said grain and of jets of steam also brought into direct contact with said grain when traveling down the inner surface of an inclined rotating wire woven or foraminous cylinder, or other suitable carrier or conveyer such for example as a vibrating plate in a hot chamber. The steam thus applied to the grain simultaneously with the hot air or fumes prevents the grain from becoming burned by the hot air or fumes and has the further advantage of causing the grain to pop or burst more thoroughly and uniformly.

As regards my improved apparatus the invention consists in the combination with an inclined rotating wire woven or foraminous cylinder or other carrier or conveyer to which the grain to be treated is fed and along which it travels and a hot chamber within which said carrier is placed, of a series of nozzles to discharge steam directly upon the grain while passing down said carrier.

In the accompanying drawings:—Figure 1 is a longitudinal section on the line 1—1 of Fig. 2 of an apparatus constructed according to my invention when applied in connection with a series of grain conveyers in the form of an inclined rotating foraminous cylinder. Fig. 2 is a section of the apparatus on the broken line 2—2 of Fig. 1, looking in the direction of the arrow $x$.

In the drawings $a$ represents a hot chamber which is shown as heated by means of direct fumes from a fire at $b$ but any other means of heating it either by direct fumes, or by hot air can be adopted.

$c$ is a chimney or outlet to the chamber.

$d\ d$ are wire woven or other foraminous inclined cylinders the shafts $e$ of which are mounted in bearings at $f f$ in the end walls of the chamber $a$.

$g\ g$ is bevel gearing by which rotary motion is transmitted to the cylinders $d$ from a shaft $h$ driven by a belt $i$ and pulley $k$. It is obvious that any other suitable means for transmitting rotary motion to the cylinders can be adopted such for example as a pulley on the shaft $e$ of each cylinder driven by a belt from any available source of power. Each cylinder $d$ is fitted with a feed chute $l$ supplied with grain from a hopper (not shown) or otherwise and each cylinder $d$ is also fitted with a discharge chute $m$.

$n\ n$ are steam pipes extending externally along the lower parts of the sides of the cylinders $d$ from the bottom end of same for about half their length more or less. These pipes $n\ n$ are supplied with steam from a pipe $p$ and are each fitted with nozzles $q\ q$ the outlets or mouths of which are directed toward the cylinders so as to discharge steam against and through their foraminous surface.

When the apparatus is in use the grain entering the upper end of each rotating foraminous cylinder $d$ from the feed chute $l$ travels down the cylinder, being continually turned over by the rotation of said cylinder, and on reaching the lower end it falls into the discharge chute $m$. During its passage down the cylinder the grain is heated by the hot fumes which tend to pop or burst it; but by the time it has passed down about one half more or less of the cylinder the heat is liable to burn the grain. The steam jets however play upon it from this part of its travel until it reaches the lower end of the cylinder, and the steam not only effectually prevents any burning of the grain but also causes it to pop or burst more thoroughly and uniformly.

The number of the foraminous cylinders $d$ in the same hot chamber can of course be varied; and any other suitable carrier along which the grain is caused to travel can be employed in lieu of the said cylinders.

What I claim, and desire to secure by Letters Patent, is—

1. The process or method of popping or bursting barley, maize or other grain, which consists in submitting the grain to the simultaneous action of hot fumes or hot air and of steam jets brought into direct contact with the grain when traveling down a carrier, substantially as and for the purpose set forth.

2. In apparatus for popping or bursting barley, maize or other grain, the combination of a carrier along which the grain travels, a hot chamber containing said carrier, and a series of nozzles to discharge steam directly upon the grain while traveling along said carrier, substantially as and for the purpose set forth.

3. In apparatus for popping or bursting barley, maize or other grain, the combination of a rotating foraminous inclined cylinder along which the grain travels, a hot chamber containing said cylinder and a series of nozzles to discharge steam directly upon the grain while traveling along said cylinder, substantially as and for the purpose set forth.

4. In apparatus for popping or bursting barley, maize or other grain, the combination with a hot chamber $a$, rotating foraminous inclined cylinder $d$, feed chute $l$ and discharge chute $m$, of a steam pipe $n$ fitted with nozzles $q$ to discharge the steam against and through said cylinder, substantially as described and shown in the drawings.

In witness whereof I have hereunto signed my name in the presence of two subscribing witnesses.

JAMES WHITE.

Witnesses:
REGINALD MORTIMER,
THOMAS LAING WHITEHEAD.